United States Patent
Börnchen et al.

(10) Patent No.: US 6,796,601 B2
(45) Date of Patent: Sep. 28, 2004

(54) ARMREST SUBASSEMBLY FOR VEHICLE DOOR

(75) Inventors: Thomas Börnchen, Bainberg (DE); Michael Eisentraudt, Stockheim (DE); Eckart Listl, Viereth-Trunstadt (DE); Martin Schlechtriemen, Hallstadt (DE); Werner Stammberger, Weissenbrunn (DE); Thomas Pohl, Grossenseebach (DE); Frank Wagner, Nürnberg (DE); Sandro Wartzack, Hallstadt (DE)

(73) Assignee: Brose Fahrzeugteile GmbH & Co., KG, Coburg, Coburg (DE)

( * ) Notice: Subject to any disclaimer, the term of this patent is extended or adjusted under 35 U.S.C. 154(b) by 0 days.

(21) Appl. No.: 10/470,239

(22) PCT Filed: Jan. 14, 2002

(86) PCT No.: PCT/DE02/00120

§ 371 (c)(1),
(2), (4) Date: Jul. 24, 2003

(87) PCT Pub. No.: WO02/060721

PCT Pub. Date: Aug. 8, 2002

(65) Prior Publication Data

US 2004/0075297 A1 Apr. 22, 2004

(30) Foreign Application Priority Data

Jan. 29, 2001 (DE) ........................................ 101 04 077
Sep. 10, 2001 (DE) ........................................ 101 44 492
Sep. 10, 2001 (DE) ........................................ 101 44 485

(51) Int. Cl.⁷ ................................................. B60J 5/00

(52) U.S. Cl. ..................................................... 296/153

(58) Field of Search ....................... 296/153; 297/411.2, 297/411.21

(56) References Cited

U.S. PATENT DOCUMENTS

| | | | | | |
|---|---|---|---|---|---|
| 1,742,447 | A | * | 1/1930 | McKeag | 296/153 |
| 4,135,759 | A | * | 1/1979 | Bott et al. | 296/153 |
| 4,592,584 | A | * | 6/1986 | White, Jr. | 296/153 |

(List continued on next page.)

FOREIGN PATENT DOCUMENTS

| | | |
|---|---|---|
| DE | 39 30 270 A1 | 3/1991 |
| DE | 40 02 242 A1 | 8/1991 |
| DE | 40 02 243 A1 | 8/1991 |
| DE | 41 35 279 A1 | 4/1993 |
| EP | 0 669 221 A1 | 8/1995 |
| EP | 1 048 517 A1 | 11/2000 |

OTHER PUBLICATIONS

English Translation of International Preliminary Examination Report of corresponding International Application PCT/DE02/00120, dated Feb. 13, 2003.
International Search Report of PCT/DE02/00120, dated Jul. 31, 2002.
International Preliminary Examination Report of PCT/DE02/00120, dated Feb. 13, 2003.

Primary Examiner—Lori L. Coletta
(74) Attorney, Agent, or Firm—Christie, Parker and Hale LLP

(57) ABSTRACT

An armrest subassembly for a motor vehicle is provided, which includes an arm support adjustable along a vertical vehicle axis, and a guide device through which the arm support is guided. According to one embodiment of the invention, the guide device has just one guide element which entends longitudinally along the adjustment direction with which the arm support is guided in the adjustment direction so that forces acting on the arm support in the vehicle longitudinal direction are introduced through the guide element into the supporting door element and movement of the arm support in the vehicle longitudinal direction is substantially prevented.

27 Claims, 15 Drawing Sheets

U.S. PATENT DOCUMENTS

| | | | |
|---|---|---|---|
| 4,619,478 A | * 10/1986 | Heimnick et al. | 296/153 |
| 4,659,135 A | * 4/1987 | Johnson | 296/153 |
| 4,890,878 A | * 1/1990 | Harary et al. | 296/153 |
| 5,795,025 A | 8/1998 | Murphy | |
| RE36,059 E | * 1/1999 | Thomas | 296/153 |
| 5,921,610 A | 7/1999 | Grimes | |
| 5,964,497 A | * 10/1999 | Wiles | 296/153 |
| 5,967,594 A | * 10/1999 | Ramanujam | 296/153 |

* cited by examiner

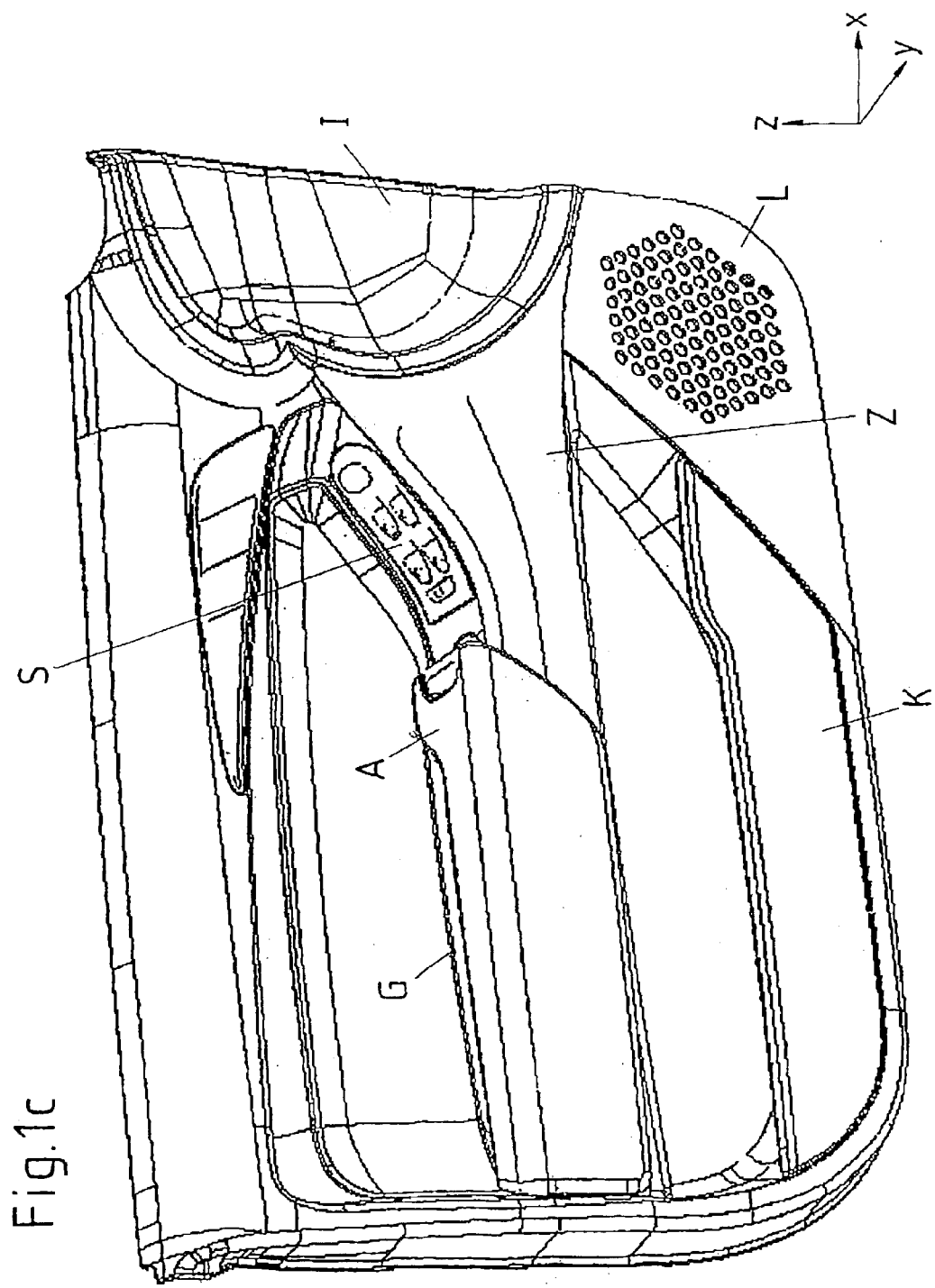

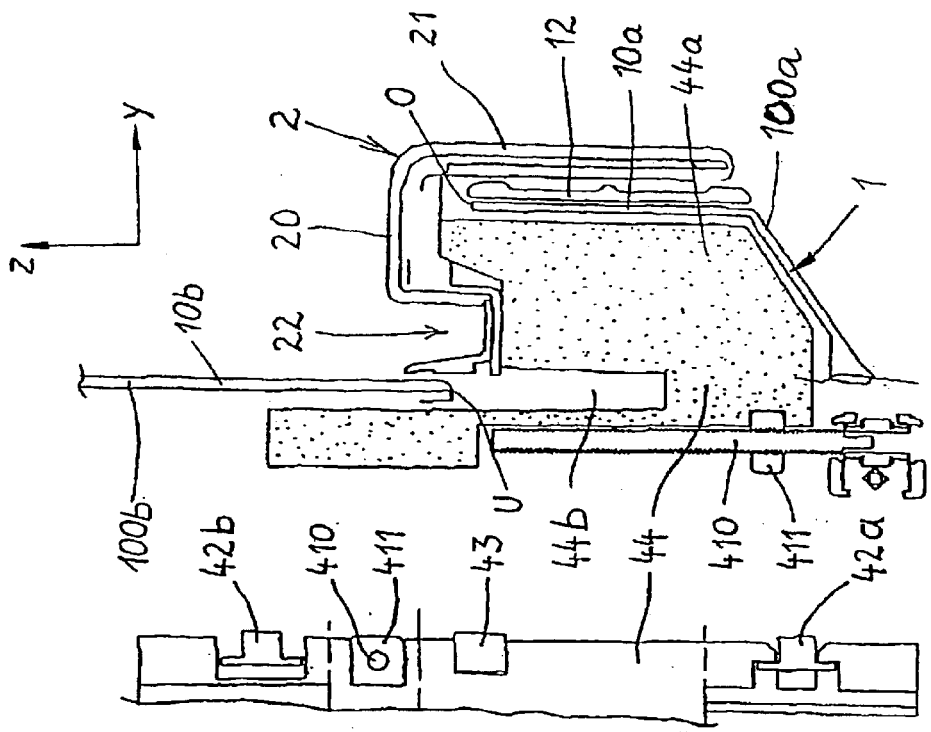
Fig. 4b
Fig. 4c
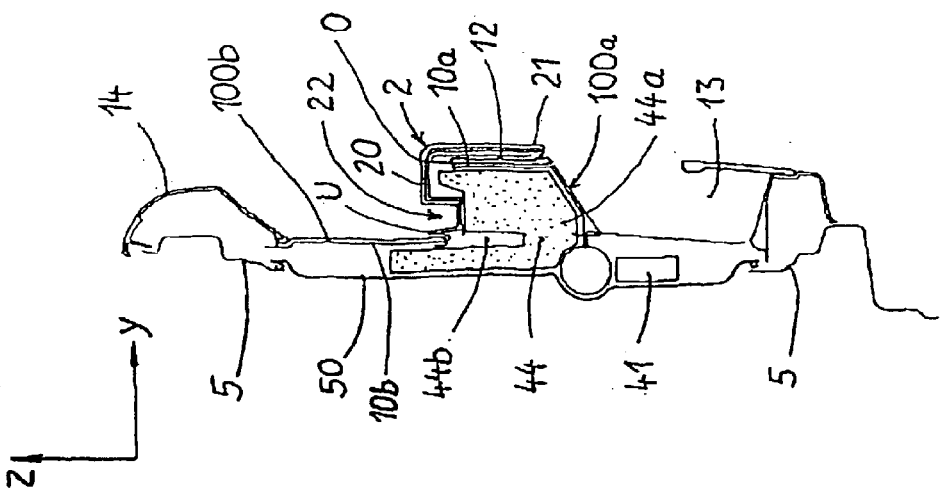
Fig. 4a

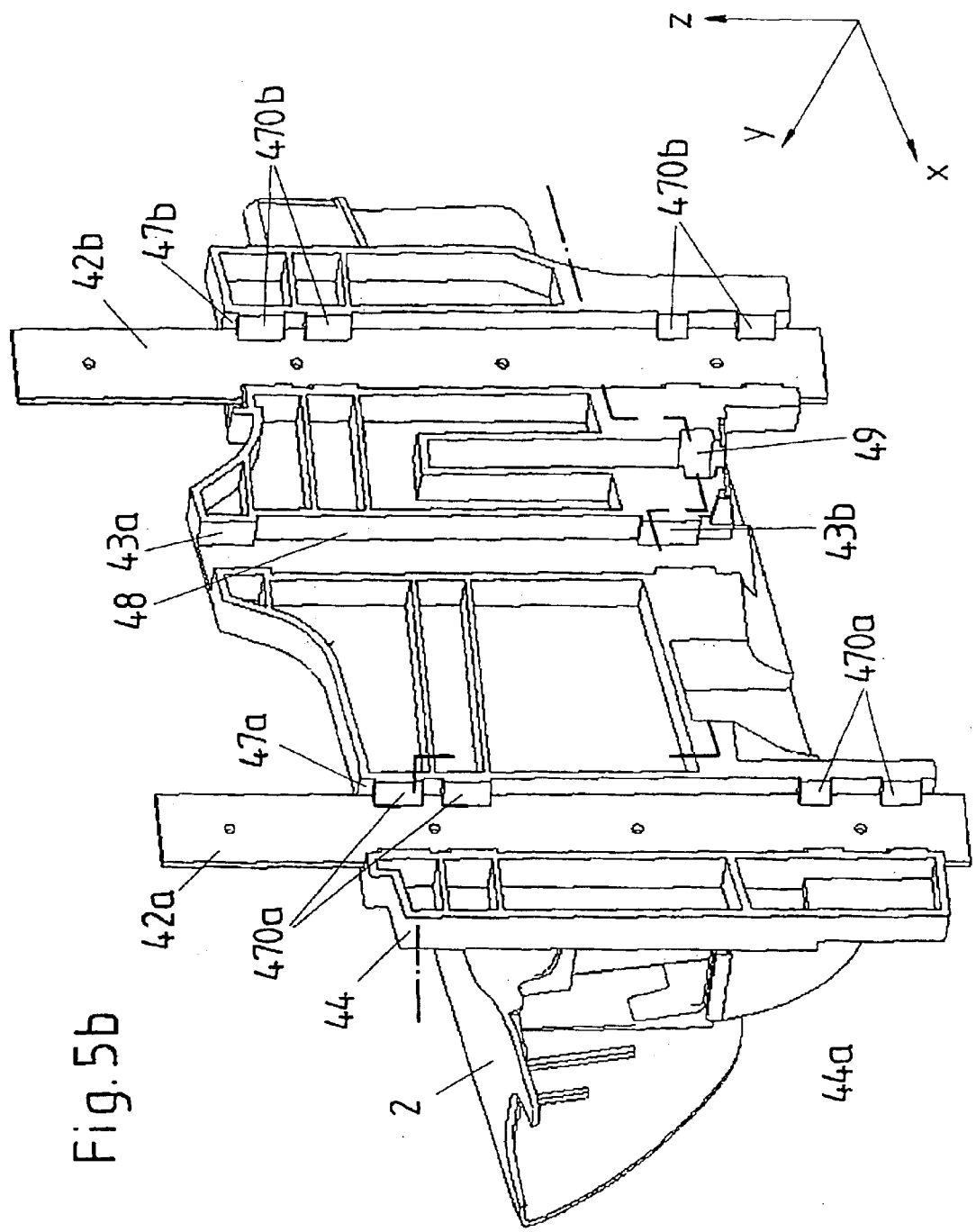

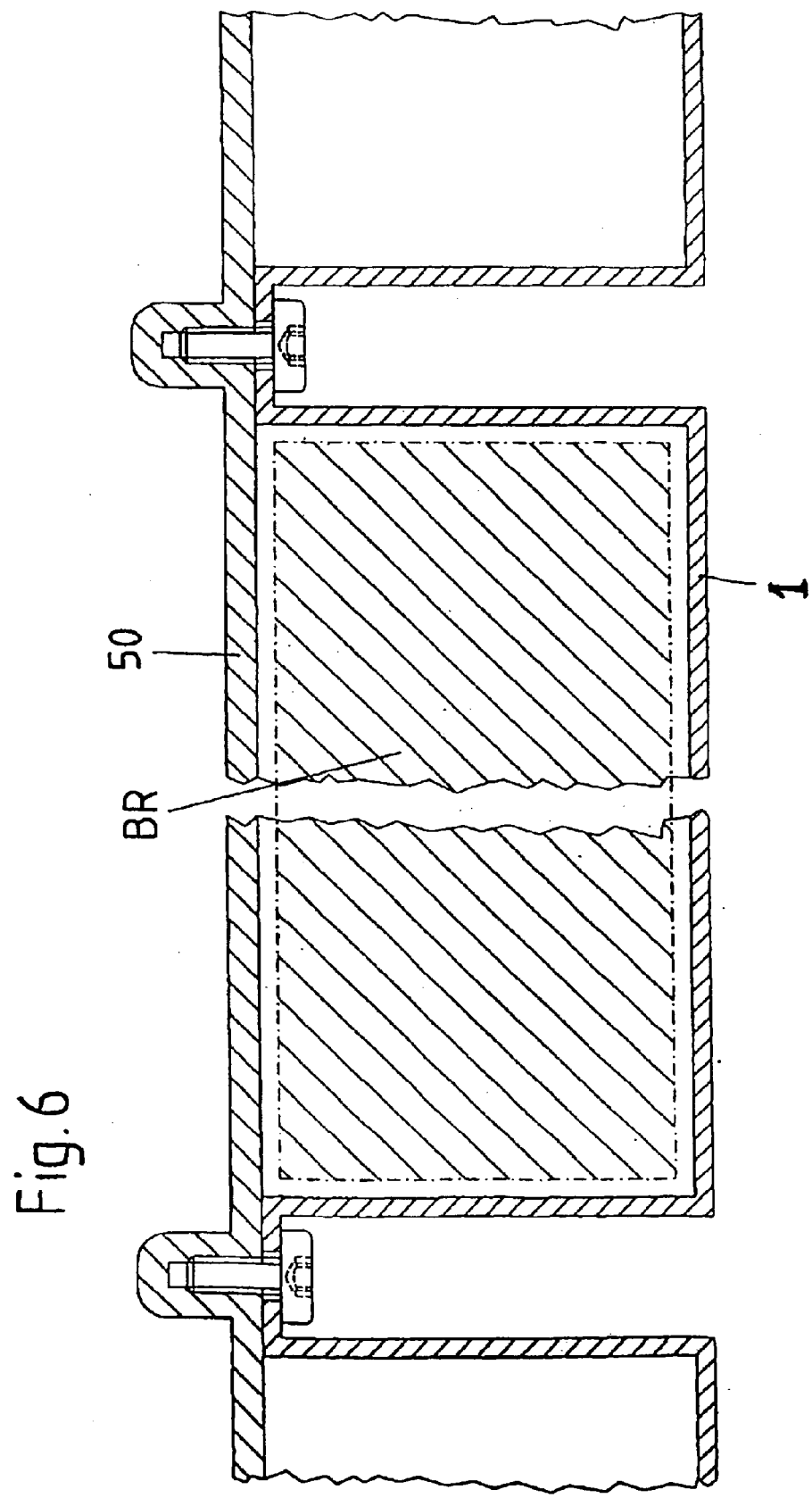

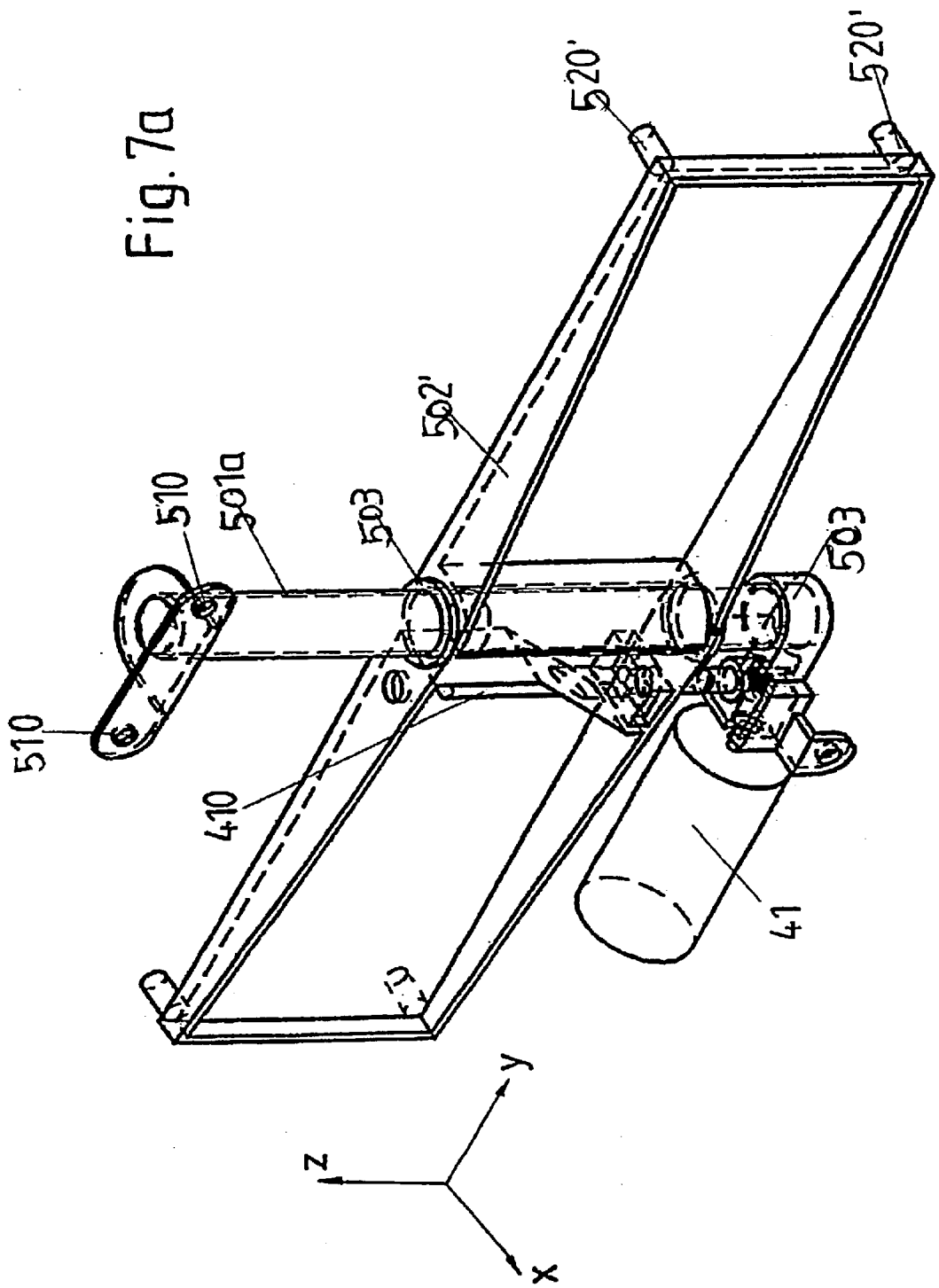

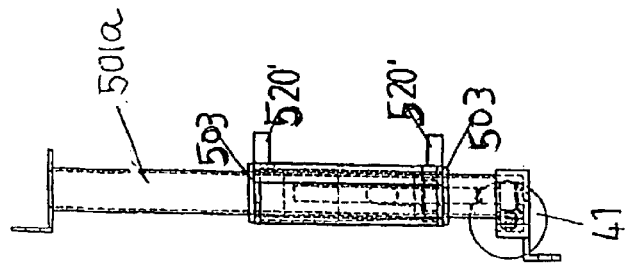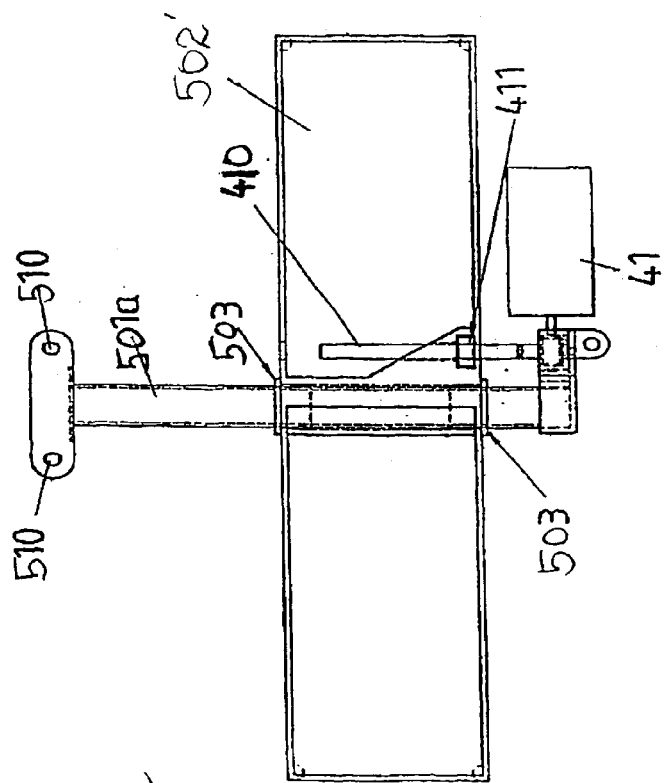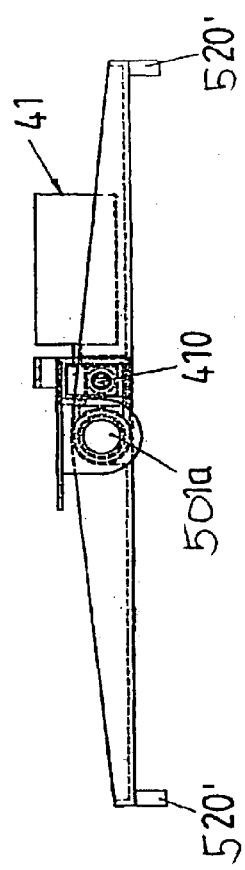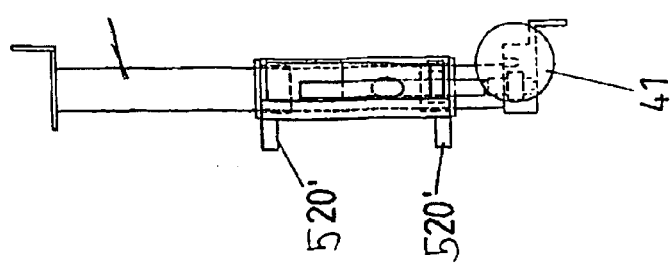

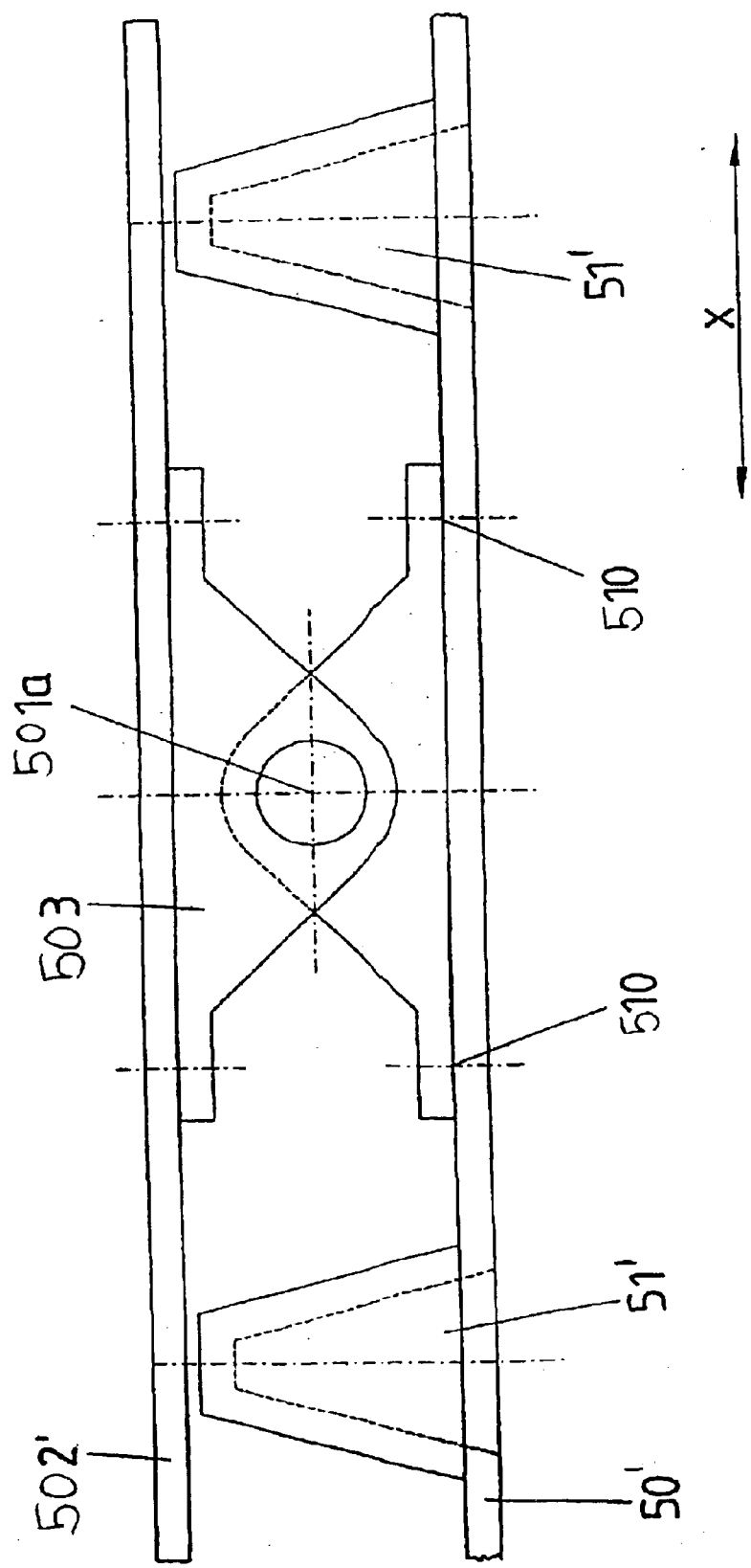

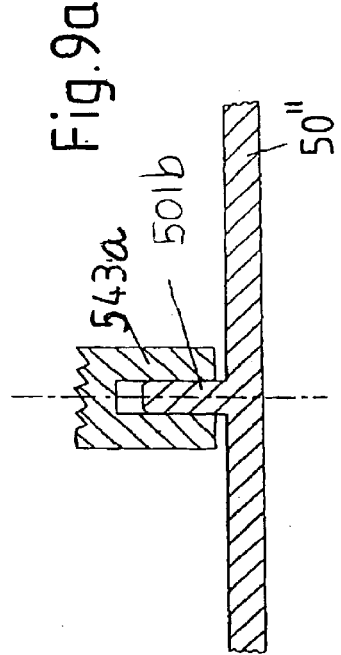
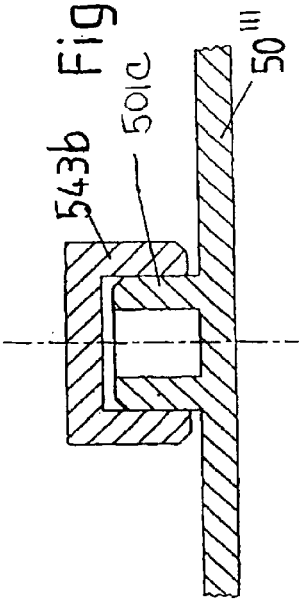
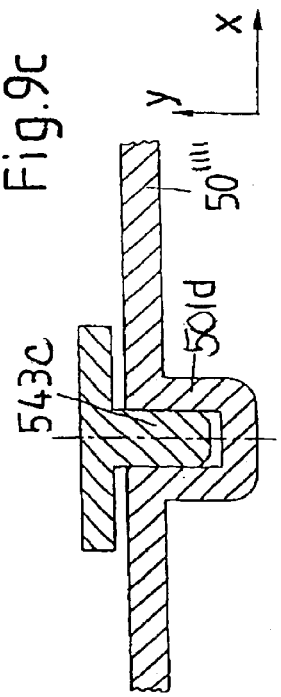
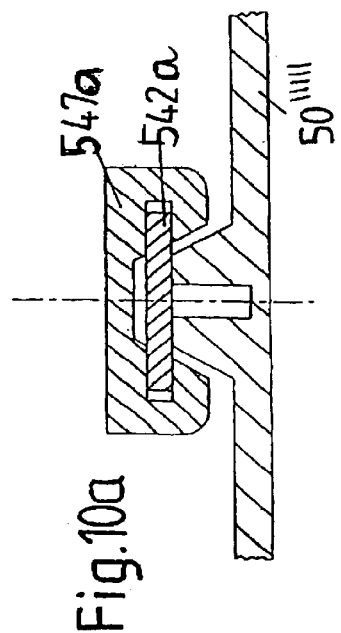
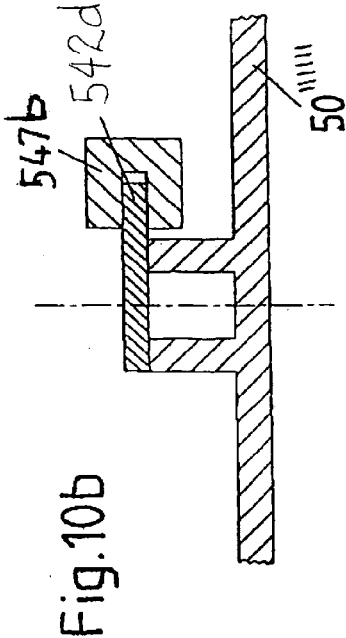
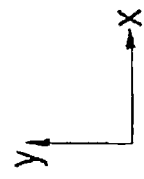

ARMREST SUBASSEMBLY FOR VEHICLE DOOR

Cross-Reference to Related Application

This application is a National Phase Patent Application of International Application Number PCT/DE02/00120, filed on Jan. 14, 2002, which claims priority of German Patent Application Number 101 04 077.6, filed on Jan. 29, 2001, German Patent Application Number 101 44 485.0, filed on Sep. 10, 2001, and German Patent Application Number 101 44 492.3, filed on Sep. 10, 2001.

FIELD

The invention relates to an armrest subassembly for a vehicle door for installation in a motor vehicle that has a vehicle longitudinal axis, which when the vehicle is being driven straight corresponds to the driving direction, and a vertical vehicle axis, which runs perpendicular to the vehicle longitudinal axis.

An armrest subassembly of this kind includes an arm support which is vertically adjustable along the vertical vehicle axis, and a guide device by means of which the armrest is guided along the vertical vehicle axis.

BACKGROUND

An armrest subassembly of this kind is known from DE 40 02 242 A1. The guide device described there comprises two parallel guide rails extending in the adjustment direction of the arm support and spaced from each other in the vehicle longitudinal direction for guiding the arm support.

SUMMARY

The object of the invention is to provide an armrest subassembly of the kind mentioned at the beginning which is characterized by a novel guide device.

According to one embodiment of the invention, the guide device has just one guide element which extends longitudinally along the adjustment direction and with which the arm support is guided in the adjustment direction so that forces acting on the arm support in the vehicle longitudinal direction are introduced through the guide element into the supporting door element and movement of the arm support in the vehicle longitudinal direction is substantially prevented.

The adjustment of the arm support need not thereby take place exactly parallel to the vertical vehicle axis. Rather, it is decisive that the adjustment movement comprises a substantial component along the vertical vehicle axis so that the arm support is raised or lowered during an adjustment movement.

The just one guide element need not be a one-piece guide element. Rather the guide element can also consist of several sections arranged in succession along the adjustment direction of the arm support. It is only essential that seen along the vehicle longitudinal axis a guide element runs along the adjustment direction of the arm support only at one point. The guide element thus does not comprise several separate guide elements spaced from each other along the vehicle longitudinal direction, but viewed in the vehicle longitudinal direction—only one cohesive guide area. This is designed so that forces acting on the arm support in the vehicle longitudinal direction, which occur for example when supporting an arm, are introduced into a supporting door element without causing undesired displacement of the arm support in the vehicle longitudinal direction or damage to the armrest subassembly.

In addition, the elongated guide element can be compensated to prevent the arm support from tilting about an axis (horizontal vehicle transverse axis) running perpendicular to the door plane, i.e. the plane spanned by the vehicle longitudinal axis and the vertical axis.

The arm support can be fixed on a height adjustable holder, e.g. in the form of a support plate and thus can be vertically adjusted together with the same.

The guide element can be formed in particular through a preferably tubular shaped post which can be for example a hollow cylindrical or formed as a profiled part (profiled rail). With a hollow cylindrical design of the guide element this can enable a certain swivel action of the arm support about the extension direction of the guide element.

In a preferred embodiment of the invention the elongated guide element is fixed on a supporting door element; it can however be associated with the vertically adjustable arm support and can be connected thereto.

The elongated guide element is allocated at least one guide member which is displaceable relative thereto whereby the desired adjustment of the arm support can be produced through the relative movement of guide element and guide member.

In particular two guide members spaced from each other along the extension direction of the guide element can be provided displaceable relative to the guide element. The two guide members are thereby arranged so that they have the greatest possible distance along the extension direction of the guide element within the existing structural conditions. As an alternative just one guide member can be provided which has the greatest possible length along the extension direction of the guide element within the existing structural conditions.

In each case it is to be achieved that the guide element on the one hand and the at least one guide member on the other still interact at the widest spaced points possible along the extension direction of the guide element in order to enable an optimum torque compensation which prevents the arm support from tilting.

Depending on the design of the elongated guide element the guide members can be formed by guide bushes, tapered areas of a guide channel or by profiled members.

The guide members are preferably fixed relative to the arm support corresponding to the preferred fixing of the guide element on a supporting door element, e.g. by fixing on the vertically adjustable holder which takes up the arm support.

When using two guide members these are preferably mounted along the vertical vehicle axis so that they extend on one edge of the holder. When using only one guide member this extends over the entire extension of the holder along the vertical vehicle axis.

In addition next to the at least one elongated guide element means can be provided which restrict or prevent swivel movement of the arm support about the vertical vehicle axis depending on whether a restricted swivel movement is to be permissible or whether any swivelling about the vertical vehicle axis is to be ruled out.

These additional means can be formed by supporting areas which are arranged so that they counteract swivelling of the arm support relative to the supporting door element from a predeterminable swivel angle. The supporting areas are preferably arranged spaced from each other in the vehicle longitudinal direction either side of the elongated guide element.

The supporting areas can be formed for example by projections which are provided between the supporting door element and the arm support, namely in particular spaced out from each other in the vehicle longitudinal direction, either side of the elongated guide element. When using a vertically adjustable holder for holding the arm support these projections are preferably located between the vertically adjustable holder and the supporting door element whereby the projections can be provided, for example moulded in one piece in particular on the supporting door element.

According to another variation the supporting areas are formed by two longitudinal guides spaced from each other in the vehicle longitudinal direction and arranged either side of the guide element, along which the arm support or its holder and the supporting door element are coupled together. These longitudinal guides can in turn be formed by a guide channel and an associated guide rod whereby the guide channel can be arranged e.g. on the holder of the arm support, and the guide rod can be mounted on the supporting door element.

It is decisive that the additional supporting areas are provided to prevent a tilting movement of the arm support about the vertical vehicle axis. The introduction of forces acting in the vehicle longitudinal direction into the supporting door element takes place on the other hand solely through the just one elongated guide element provided for this, i.e. that the additional supporting areas are formed so that with an ordinary trouble-free operation of the arm support they do not take up and transfer any forces acting in the vehicle longitudinal direction, but only tilting movements relative to the vertical vehicle axis.

In a further preferred development of the invention elastic means are provided on the adjusting mechanism of the arm support to prevent rattling.

Further features and advantages of the invention will now be explained with reference to an embodiment illustrated in the drawings in which:

FIG. 1b shows a front perspective view of the door inner trim of FIG. 1a;

FIG. 1c shows a front perspective view of the door inner trim according to FIG. 1b with a vertically adjustable arm support;

FIG. 2b shows a rotated side perspective view of the motor vehicle door shown in FIG. 2a;

FIG. 3b shows a rotated side perspective view of the partially assembled motor vehicle door shown in FIG. 3a.

FIG. 4a shows a cross-section through a door inner trim with an arm support fixed on a height adjustable holder;

FIG. 4b shows a longitudinal cross-section through the drive and guide means of a vertically adjustable arm support according to FIG. 4a;

FIG. 4c shows an enlarged cross-section of the armrest area according to FIG. 4a;

FIG. 5b shows a rear perspective view of the guide device of FIG. 5a;

FIG. 6 shows a diagrammatic top cross-sectional view of the structural space in a motor vehicle door which serves to hold an armrest;

FIGS. 7a shows a semi-transparent rear view of a guide device for a vertically adjustable arm support which has just one elongated guide element in the form of a tubular guide post;

FIG. 7b shows a semi-transparent top view of the guide device of FIG. 7a.

FIG. 7c shows a semi-transparent first side view of the guide device of FIGS. 7a–7b.

FIG. 7d shows a semi-transparent rear view of the guide device of FIGS. 7a–7c.

FIG. 7e shows a semi-transparent second side view of the guide device of FIGS. 7a–7d.

FIG. 8 shows a top cross-sectional view through a guide device of the type shown in FIGS. 7a to 7e whereby means are additionally provided for restricting tilting of the arm support about the vertical vehicle axis;

FIG. 9a shows a top cross-sectional views of another embodiments of a guide post extended along the vertical vehicle axis as well as the relevant guide member;

FIG. 9b shows a top cross-sectional view of yet another embodiment of a guide post extended along the vertical vehicle axis as well as the relevant guide member.

FIG. 9c shows a top cross-sectional view of vet another embodiment of a guide post extended along the vertical vehicle axis as well as the relevant guide member.

FIG. 10a shows a top cross-sectional view of an embodiment of an anti-tilt lock for an arm support.

FIG. 10b shows a top cross-sectional view of another embodiment of an anti-tilt lock for an arm support.

DETAILED DESCRIPTION OF THE PREFERRED EMBODIMENTS

Figure 1A:
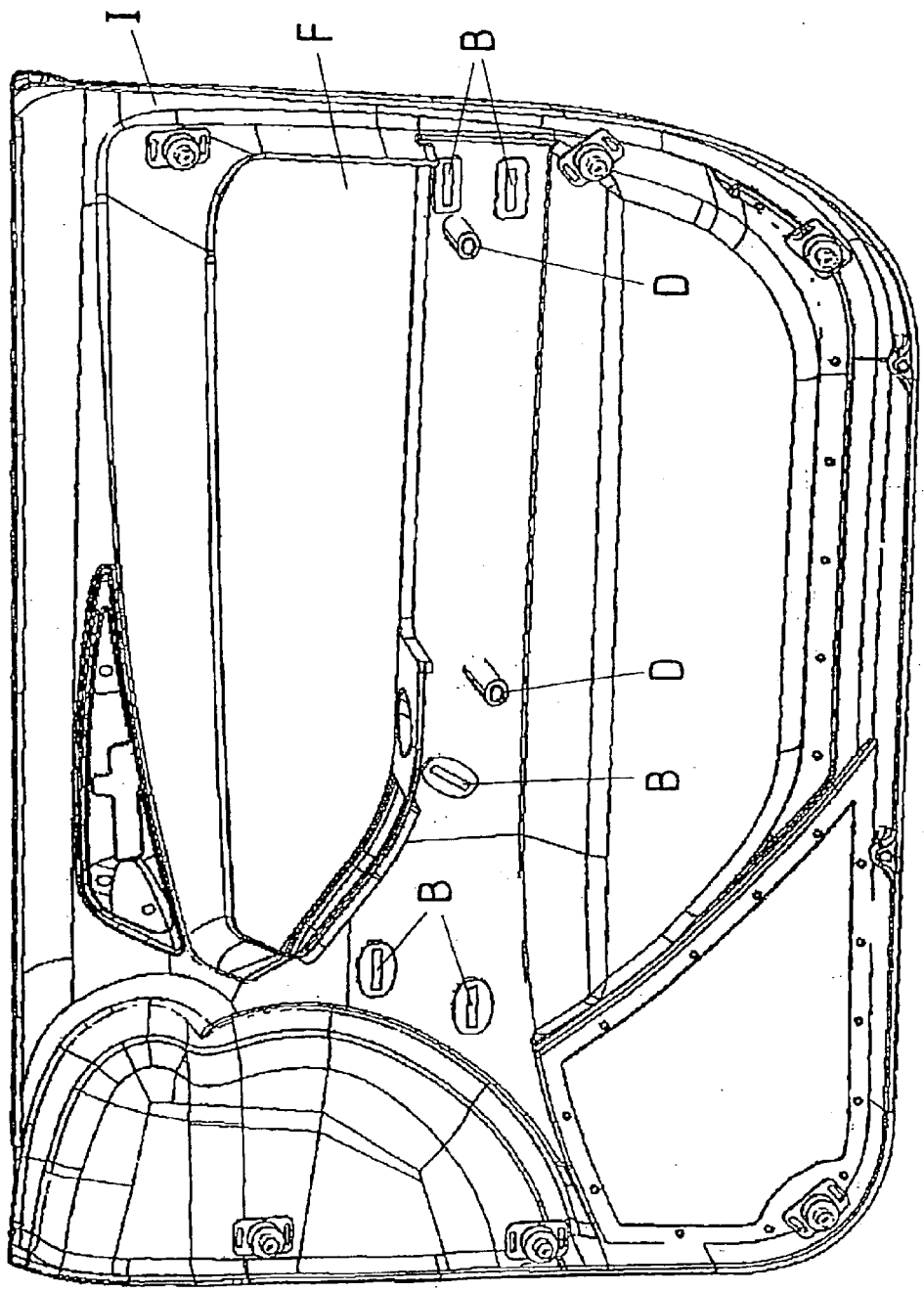
FIG. 1a shows a rear perspective view of a door inner trim.
Figure 1B:
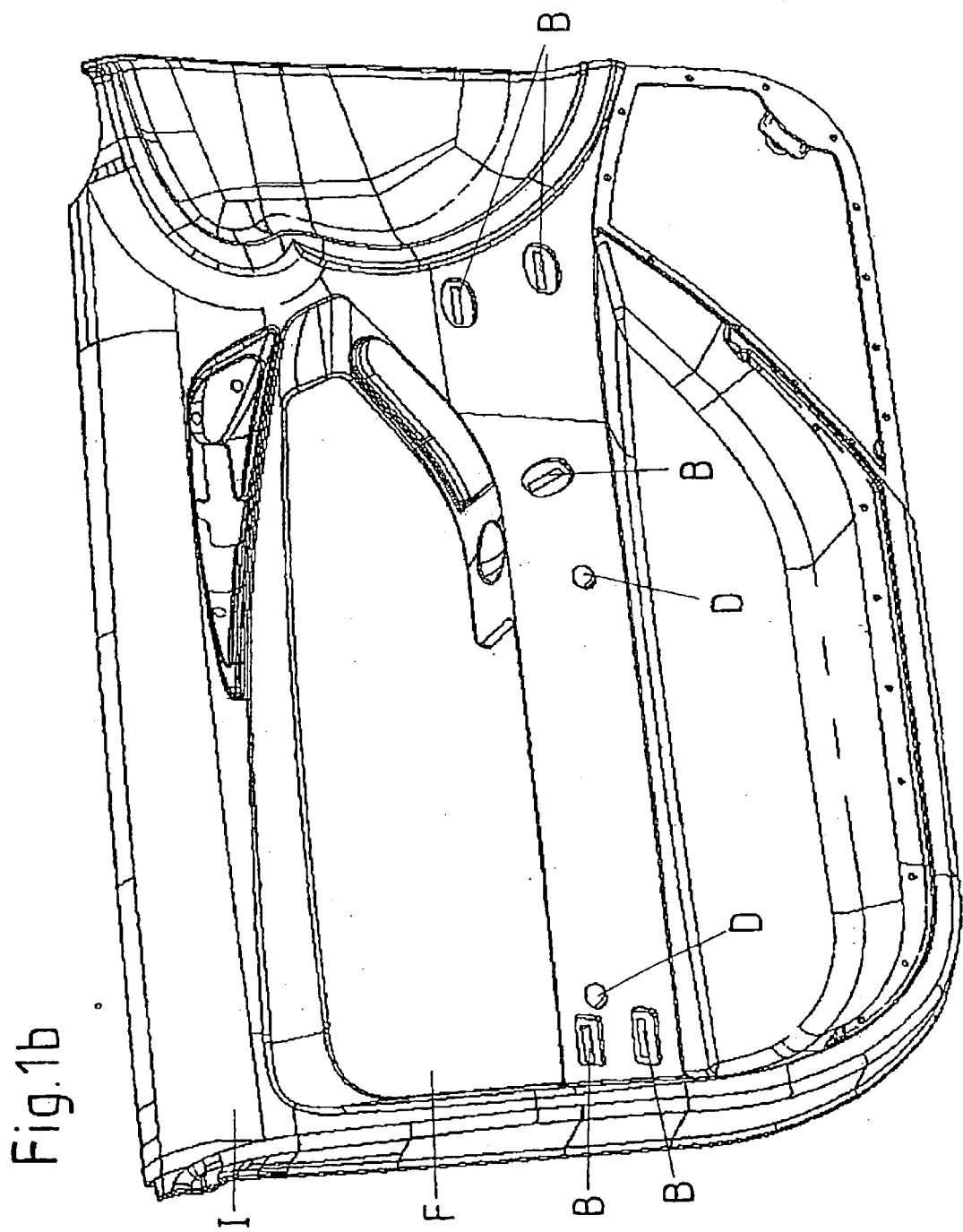

FIGS. 1a and 1b show a rear view (seen from the door inside panel of a vehicle door) and a front view (seen from the interior space of a vehicle) of a door inner trim I with which the door inside plate of a vehicle door is covered and lined in respect of the door interior space. The door inner trim I has on the back two spacer elements D which are supported by their end side facing away from the door inner trim on the door inside plate or on a base plate connected to the door inside plate when the door inner trim I is fixed on the door inside plate. The distance between the door inner trim and the door inside plate is hereby fixed. The spacer elements D are designed hollow cylindrical so that fixing screws can pass through same to fix the door inner trim on the door inside plate.

The door inner trim I furthermore has a free space F which permits an arm support to be fitted. Underneath the free space F there are fixing points B for fixing a decor strip on the door inner trim I.

FIG. 1c shows the door inner trim I in a view according to FIG. 1b after fixing an armrest subassembly with an arm support A which has an indent handle G. Furthermore in front of the arm support A is a switch block S with which electrical function components of the vehicle such as e.g. the arm support itself, as well as the electric window lifter or electric seat adjuster devices can be operated.

A decor strip Z of the door inner trim I is fixed underneath the arm support A and overlaps with a section of the arm support A which extends parallel thereto. Underneath the decor strip Z is a card tray K and speaker cover L.

Figure 2A:
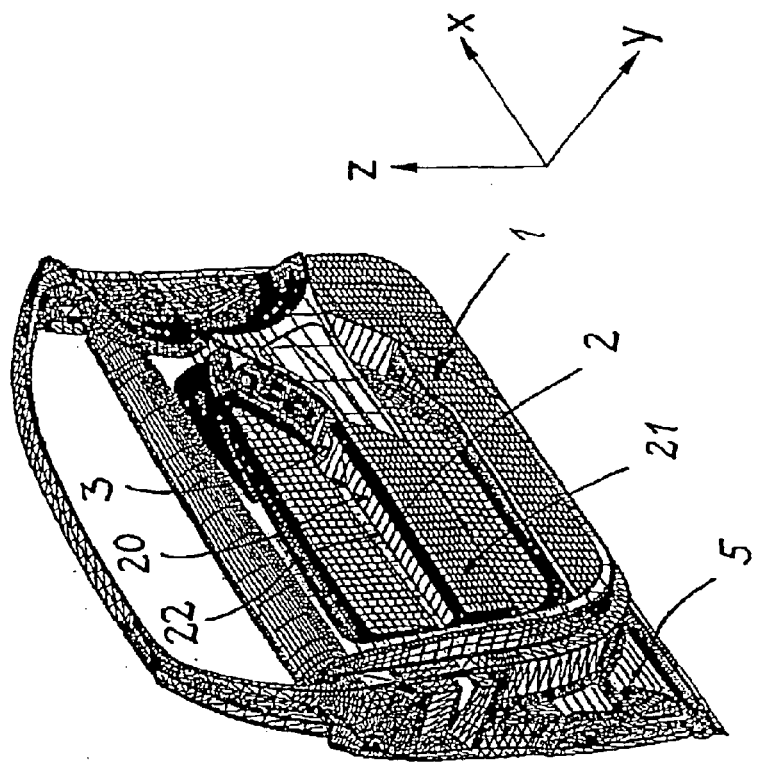
FIG. 2a shows a front perspective view of a motor vehicle door with a vertically adjustable armrest.
Figure 2B:
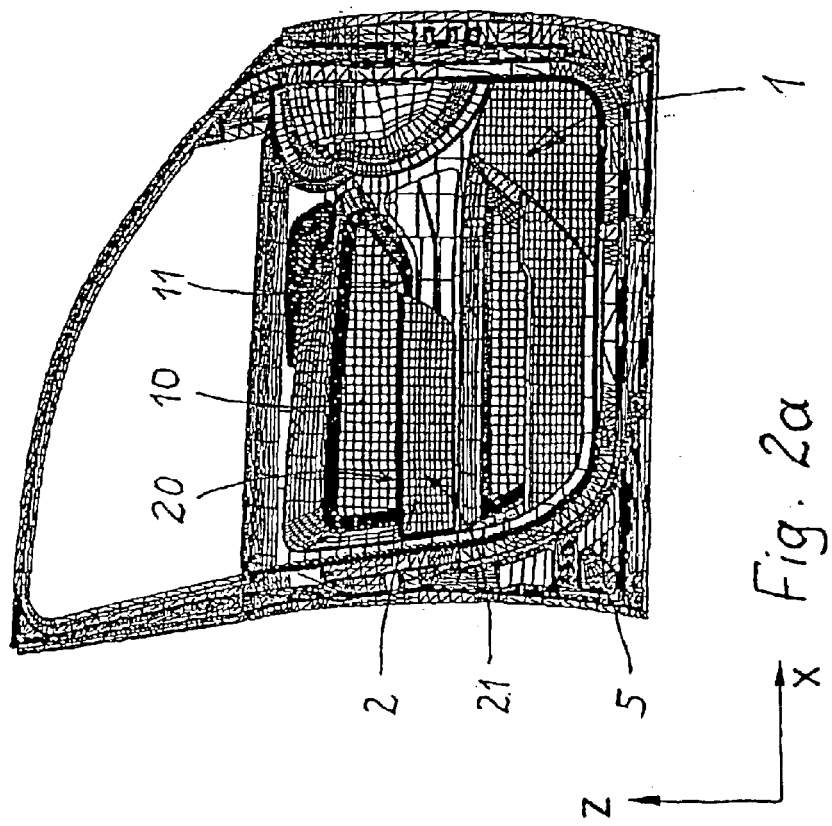

FIGS. 2a and 2b show in different views each perspectively a vehicle door which is lined in respect of the vehicle interior with a door inner trim and which has a vertically adjustable arm support 2 which forms together with the door inner trim 1 a door inner trim module with adjustable height for the arm support. The surface 10 of the door inner trim 1 extends substantially in the door plane, i.e. in a plane which is defined by the vehicle longitudinal axis x as well as the vertical vehicle axis z.

The arm support 2 has a supporting area 20 extending in the vehicle longitudinal direction x and extending substantially perpendicular to the door plane, as well as a trim area 21 which projects down from the supporting area 20 along the vertical vehicle axis z and which overlaps with a section of the door inner trim 1 running parallel thereto. The trim area 21 need thereby not run exactly parallel to the vertical vehicle axis z; even with a slight incline of the trim area 21 relative to the vertical vehicle axis z the former still extends along the latter. The same applies correspondingly for the overlapping section of the door Inner trim 1. The arm support 2 thus has the shape of an inverted L whereby the supporting area 20 forms the one arm and the trim area 21 forms the other arm of the L-shaped arm support 2 and the trim area 21 extends along the vertical vehicle axis and thereby its free end faces away down from the supporting area which extends substantially horizontally.

Seen from the inside of the vehicle an integrated handle indent 22 is provided in the arm support behind the supporting area 20 of the arm support which can replace a grab handle and extends in the vehicle longitudinal direction x substantially over the entire length of the arm support 2. The supporting area 20 of the arm support runs substantially horizontal i.e. in a plane which is defined by the vehicle longitudinal axis x as well as the vehicle transverse axis y which runs perpendicular to the door plane. This supporting area 20 serves to support the under arm of the vehicle occupant and to adapt to the requirements of different vehicle occupants is vertically adjustable along the vertical vehicle axis z, namely together with the arm support 2 as a whole.

In order to operate the height adjustment of the arm support 2 an operating element 3 is provided which seen in the vehicle longitudinal direction x (drive direction of the corresponding vehicle when driving straight) is mounted in front of the supporting area 20 of the arm support 2 and can be comfortably gripped and operated by the hand of a vehicle occupant whose under arm is resting on the supporting area 20. An electric switch can be operated by means of this electric operating element and activates an electric adjusting device for adjusting the height of the arm support 2 and thus in particular the supporting area 20 of the arm support 2.

Figure 3B:
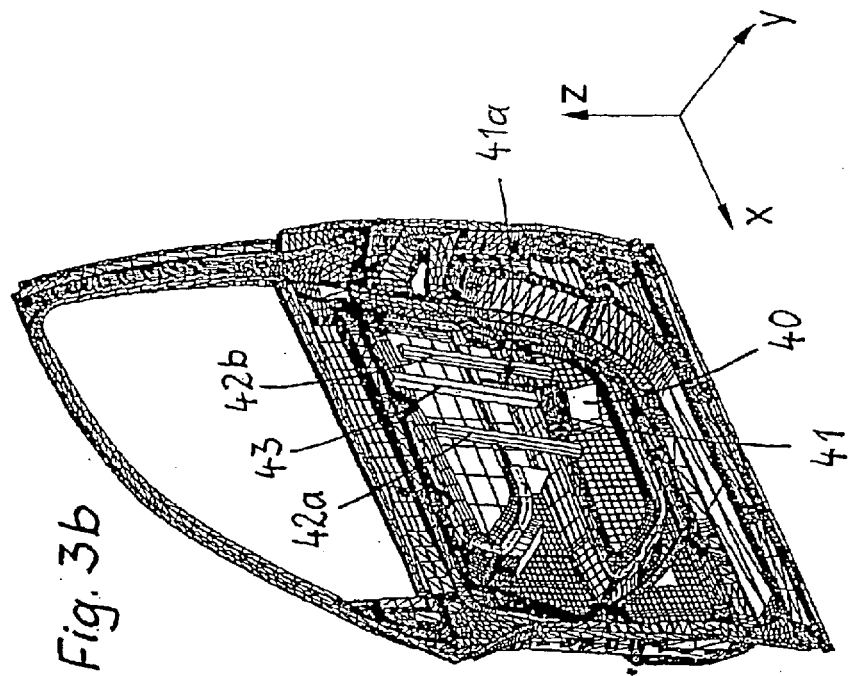
Figure 3A:
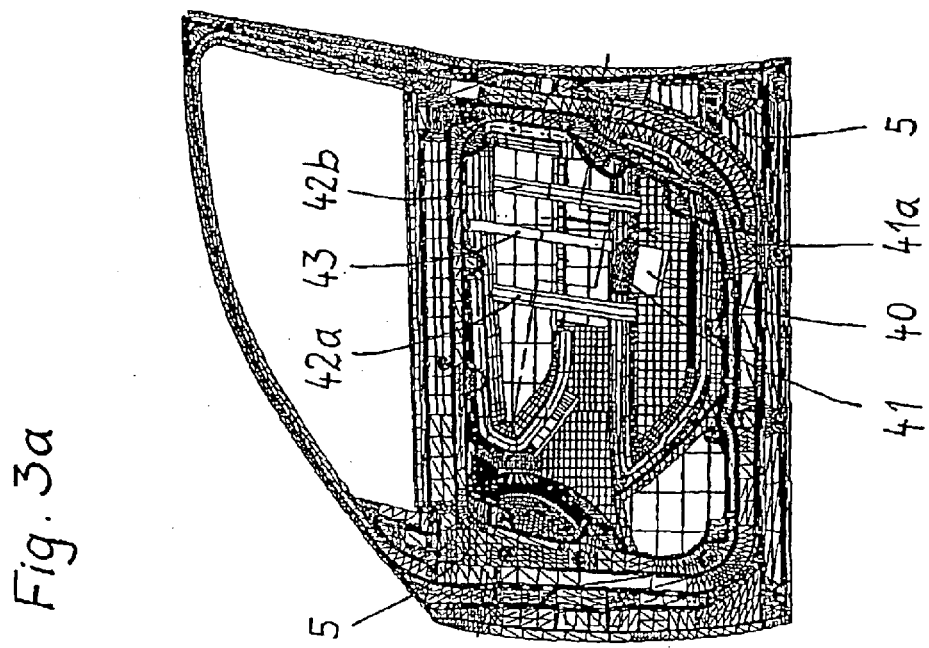
FIG. 3a shows a front perspective view of a motor vehicle door according to FIGS. 2a and 2b in a partially assembled state in which a guide device of the arm support can be seen.
Figure 3C:
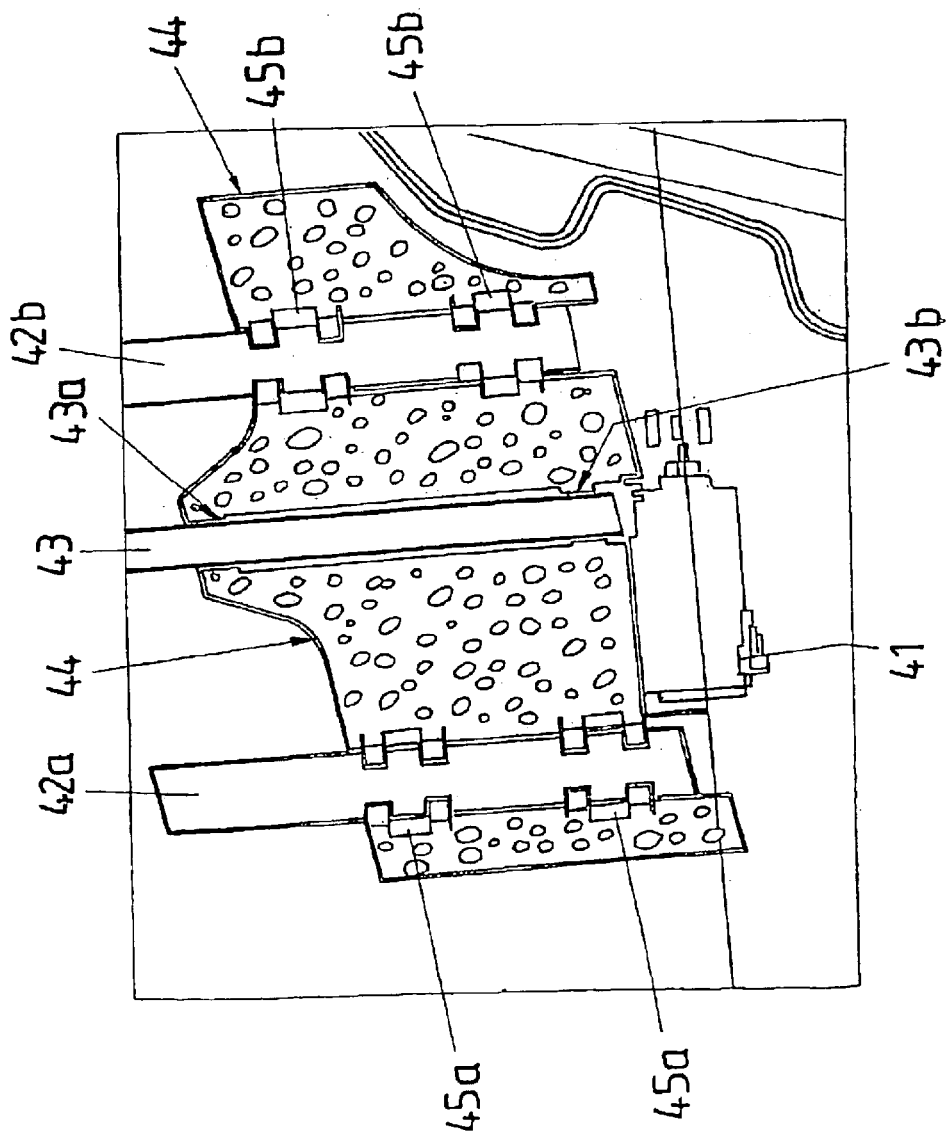
FIG. 3c shows a detailed rear perspective view of the guide device of FIGS. 3a and 3b.

FIGS. 3a to 3c show a vehicle door corresponding in structure to FIGS. 2a and 2a, namely in a partially mounted state in which the adjusting device for adjusting the height of the arm support can be seen. In order to generate the adjusting force an electric drive motor 41 is provided and has a dedicated electronics control unit 40 for controlling the adjusting speed as well as where necessary the shock-free approach of the arm support as well as to ensure an anti-jamming protection. The drive motor 41 drives a spindle gearing 41a which transfers the adjusting force of the drive motor 41 to a support plate 44 on which the vertically adjustable arm support can be fixed.

In order to guide the support plate 44 and thus the arm support during an adjustment movement along the vertical vehicle axis there is an elongated guide element 43 in the form of a guide post which extends along the adjusting direction of the arm support (slightly inclined to the vertical vehicle axis z) and on which the support plate 44 is guided so that it is possible to prevent a displacement of the support plate 44 and thus the associated arm support 2 in the vehicle longitudinal direction x (drive direction of the corresponding vehicle during straight driving) as well as a tilting movement of the arm support 2 about the horizontal vehicle transverse axis y running perpendicular to the door plate (the plane formed by the vehicle longitudinal axis x and the vertical vehicle axis z).

The guide of the support plate 44 on the guide post 43 thereby takes place through a guide channel provided on the support plate 44 and on which two guide members 43a, 43b are formed in the form of tapered areas of the guide channel. These two tapered areas 43a, 43b are provided at each one end of the continuous guide channel i.e. on one side on the upper edge along the vertical vehicle axis z and on the other side on the lower edge of the support plate 44. Tilting moments introduced through the arm support and the support plate 44 connected thereto about the vehicle transverse axis (y-axis) are hereby supported in the best possible way. In order also to support tilt moments about the vertical vehicle axis (z-axis) two side guide rails 42a, 42b are additionally provided which are spaced out from each other on either side of the central guide post 43 along the vehicle longitudinal axis x. The support plate 44 is in engagement with these through a pair of sliders 45a and 45b.

FIG. 4a shows a cross-section through a vehicle door according to FIGS. 2a and 2b. The door inside skin of the vehicle door is formed by a door inside plate 5 with a large surface area recess which is covered by an assembly support 50. A number of door components such as e.g. an electric window lifter, door lock, speaker system, side air bag and the like can be prefitted on such an assembly support 50 away from the vehicle door and then fixed as a completely pre-assembled subassembly (door module) on the corresponding vehicle door or its inside plate 5.

In the present case the assembly support 50 also supports the adjusting mechanism for the height-adjustable armrest 2 which has a drive motor 41 as drive unit. The drive motor 41 drives an adjusting mechanism which will be described below in further detail with reference to FIGS. 4b and 4c and with which a holder 44 of the arm support 2 is adjustable along the vertical vehicle axis z. The holder comprises a support plate which is mounted behind the door inner trim 1, namely both behind a lower part 100a and also an upper part 100b of the inside trim, as well as a connecting section 44a protruding therefrom which extends in the region between the free ends O, U of the door inner trim. The arm support 2 is fixed there on the holder 44 in suitable manner.

Between the support plate and the connecting section 44a of the holder 44 of the arm support 2 extends a channel-like recess 44b into which the upper part 100b of the door inner trim 1 projects at the top when the arm support 2 is adjusted. This prevents the holder 44 from colliding with the door inner trim 1 during height adjustment.

At the top the door inner trim closes with a ledge trim 14. The upper section 10*a* of the lower part 100*a* of the door inner trim 1 which becomes partially exposed when the arm support is raised by its trim area 21 is covered by a decor panel 12.

According to FIGS. 4*b* and 4*c* in order to transfer the adjusting force from the drive motor 41 to the vertically adjustable holder 44 a spindle gearing is connected to a rotatable spindle 410 driven by the drive motor, and to a spindle nut 411 which is connected rotationally secured to the holder 44 and which is displaceable along the vertical vehicle axis z, with the nut engaging round the spindle 410 and engaging with same.

The holder 44 is guided along the vertical vehicle axis along a central guide post 43 whereby two side guide rails 42*a*, 42*b* are provided additionally as an anti rotation anti tilt lock either side of the central guide post 43 whereby the holder 44 is mounted; displaceable on the guide rails by means of sliders.

The drive motor 41 can further be allocated an electronic control unit for controlling the adjusting speed for shock-free approaching the end positions of the arm support 2 as well as where required for ensuring anti-jamming protection.

Figure 5A:
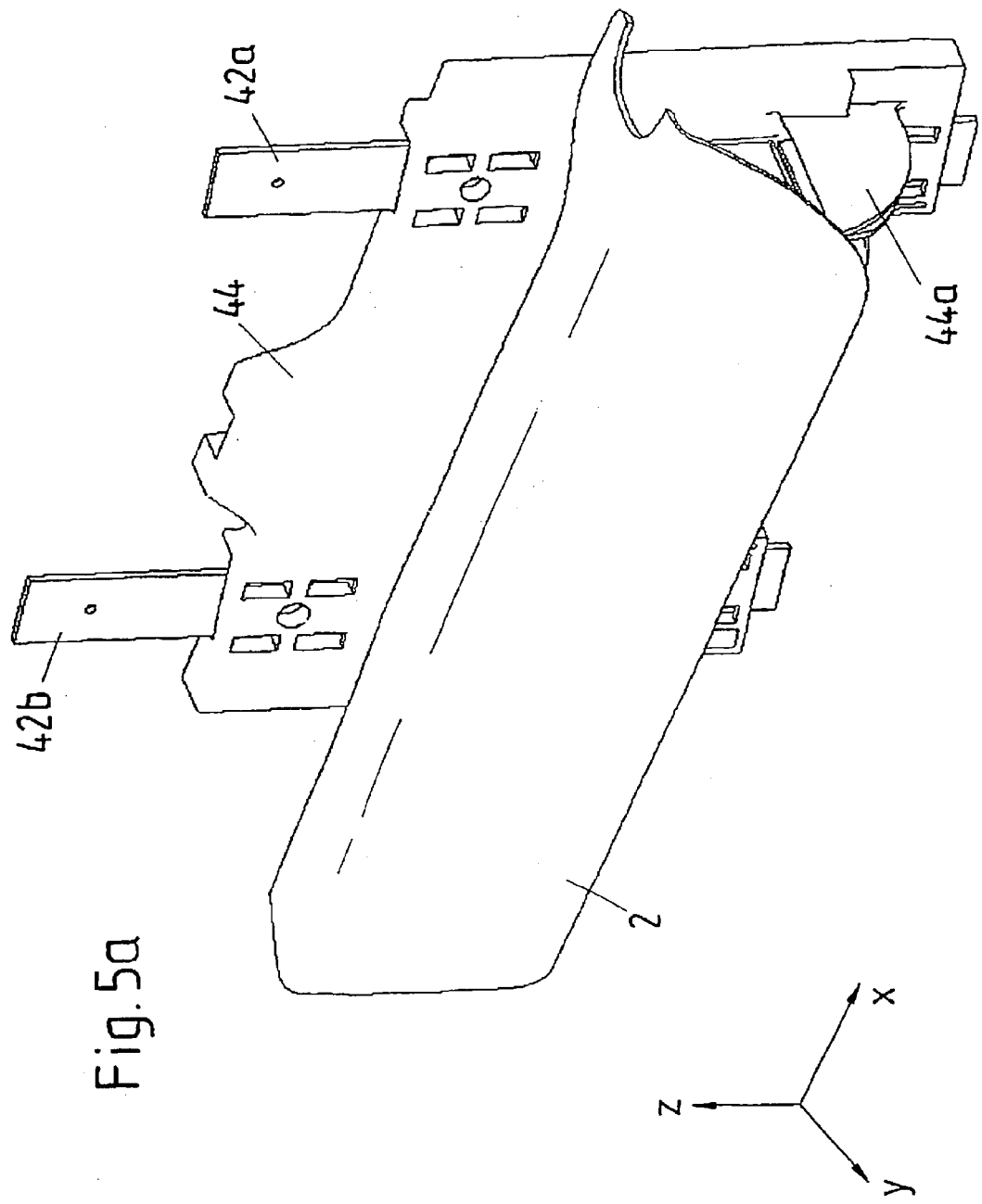
FIG. 5a shows a front perspective view of a guide device for a vertically adjustable arm support which has in addition to a central elongated guide element two guide rails as anti-rotation locks.
Figure 5C:
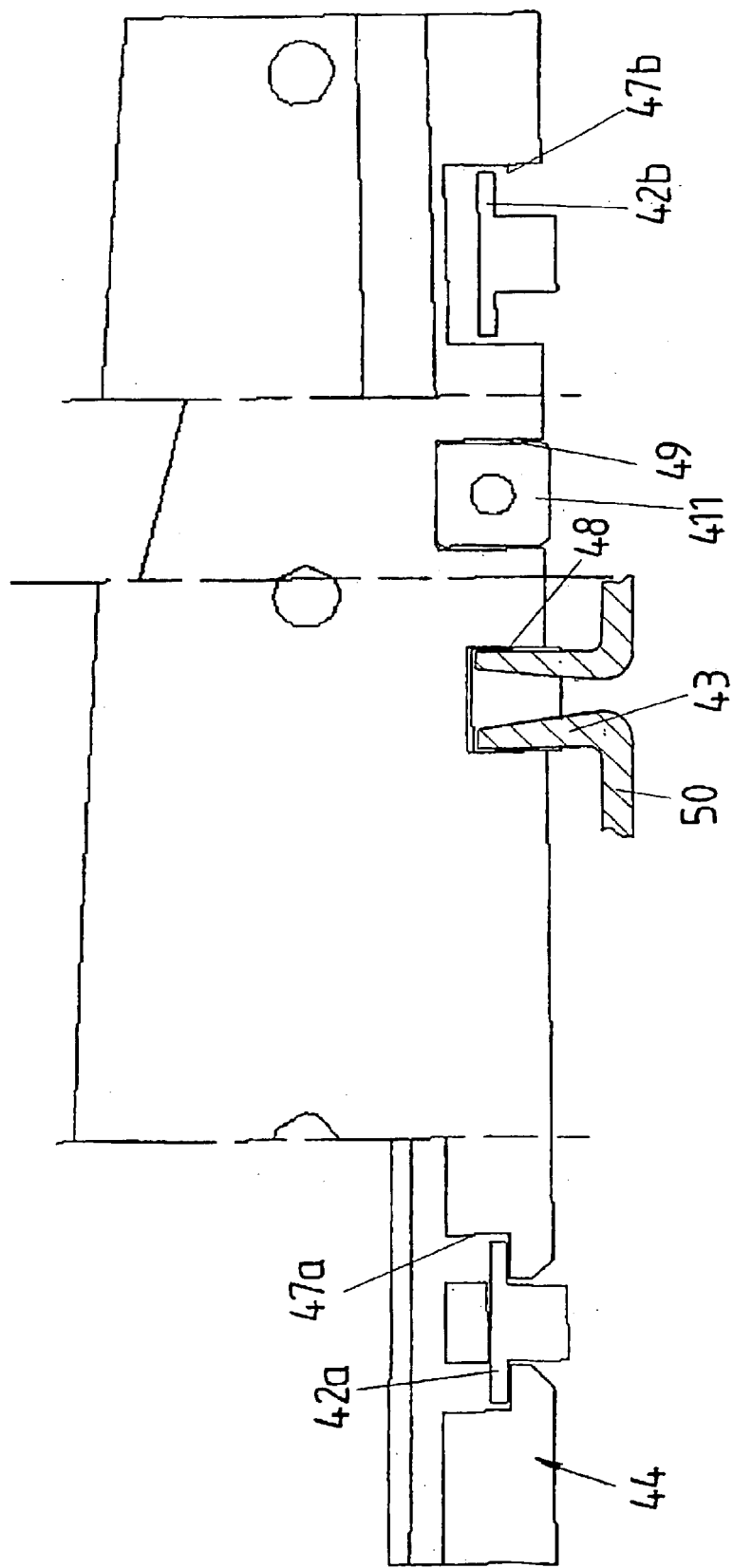
FIG. 5c shows a longitudinal cross-sectional view of the guide device of FIGS. 5a and 5b, and including an elongated guide element.

FIGS. 5*a* to 5*c* show in greater detail a guide device for an arm support 2 which is vertically adjustable along the vertical vehicle axis z and which is connected to a vertically adjustable support plate 44. For this the arm support 2 is fixed on a connecting section 44*a* protruding away from the support plate 44.

A guide channel 48 extends in the support plate 44 along the vertical vehicle axis z (but not exactly parallel to same, in this embodiment, rather slightly inclined) whereby the guide channel has at each of its upper and lower end (corresponding to the upper and lower edge of the support plate 44 in the vehicle longitudinal direction z) a guide area 43*a*, 43*b* (guide members) formed by a tapered area of the guide channel 48. The support plate 44 is guided by these guide members or guide areas 43*a*, 43*b* on a guide post (see FIGS. 3*a* to 3*c*) which likewise extends along the vertical vehicle axis and which is connected to a supporting door element, e.g. a door inner skin of a vehicle. In the region of the guide members or guide areas 43*a*, 43*b* the guide channel is adapted to the contour of the associated guide post so that the guide members or guide areas 43*a*, 43*b* engage a round the guide post practically free of play. The dimensions are selected so that on the one hand movement of the support plate 44 along the guide post is possible with slight friction and that on the other hand movement of the support plate 44 in the vehicle longitudinal direction x or a swivel movement of the support plate about the vehicle transverse axis y is prevented and forces causing such movements of the support plate 44 are introduced through the guide areas 43*a*, 43*b* and the associated guide posts into a supporting door element.

The aforementioned forces can occur for example as a person leans on the arm support whereby increased forces and torques can occur in particular if the arm support is used not simply just as a support for the underarm during driving but also for other purposes, e.g. if a vehicle occupant kneels on the arm support.

Furthermore the support plate 44 has two channels 47*a*, 47*b* spaced from each other in the vehicle longitudinal direction x and arranged either side of the central guide channel 48 into which a guide rail 42*a*, 42*b* is guided to serve as an anti-rotation lock. Also these further guide rails 42*a*, 42*b* are each fixed on a supporting door element of the vehicle door. These guide rails 42*a*, 42*b* are held rattle-free in the associated guide channels 47*a*, 47*b* by means of elastic elements moulded on the support plate 44.

The two guide rails 42*a*, 42*b* are guided relative to the vehicle longitudinal direction x with play in the associated channels 47*a*, 47*b* of the support plate 44 so that external forces which act along the vehicle longitudinal axis x, or external torque acting about the vehicle transverse axis y are introduced through the central guide channel 48 and the associated guide posts into a supporting door element and thus the door or vehicle body. Over specifying the system is thereby also avoided.

The two additional guide rails 42*a*, 42*b* serve to divert external torque which acts about the vertical vehicle axis z into a supporting door element and thus into the vehicle body. To this end the corresponding guide rails 42*a*, 42*b* are each housed with sufficient slight play between the base of the guide channel 47*a* and 47*b* and the elastic elements 470*a*, 470*b* which are opposite the channel base so that tilting movements of the support plate 44 and thus the arm support 2 about the vertical vehicle axis are prevented.

Furthermore FIGS. 5*a* to 5*c* show a C-shaped socket 49 of the support plate 44 in which the spindle nut of a spindle gear serving for the height adjustment of the arm support can be housed secured against rotation. This nut 411 is guided longitudinally displaceable on a spindle rotatable through the drive of the adjusting device of the arm support and thus transfers the adjusting force of the drive motor to the support plate 44 and the arm support 2.

FIG. 6 shows diagrammatically a sectional view through an assembly support 50 and a door inner trim 1 fixed thereon by means of screws so that a structural space BR is left free for housing a height adjustable arm support and its support plate and the required drive and guide means. To this end the door inner trim 1 in the region of the connecting points with the assembly support 50 reaches up to same but is spaced sufficiently from same between the fixing points in order to produce the structural space BR. FIGS. 7*a* to 7*e* show a 1-post guide for a height adjustable support plate 502' of an arm support which comprises a tubular shaped guide post 1*a* which is provided at its ends with a fixing flange with fixing points 510 for fixing on a supporting door element.

The holder 520' is guided on the guide post 501*a* by means of two guide sleeves 3 which are preferably integrated in one piece into the support plate 502' and which are provided at the top and lower end of the support plate 502' spaced from each other with the greatest spacing possible along the vertical vehicle axis z. To form the integral sleeves 503 the support plate 502' has at each upper and lower edge along the vertical vehicle axis a right end section which is provided with corresponding openings forming the sleeves 503. In order to fix an arm support on the support plate 502' fixing studs 520' are provided which protrude perpendicularly from the support plate 502'.

An electric drive motor 41 of the adjusting device as well as an associated spindle gearing which comprises a spindle 410 rotatable through the drive motor 41 as well as a spindle nut 411 fixed rotationally secured on the support plate 502' and displaceable along the spindle 410 are combined with the guide post 501*a* and the support plate 502' into one sub-assembly which can be pre-assembled and pre-tested as a complete unit. For this the electric drive 41 is connected to the guide post 501*a* in the region of its lower end along the vertical vehicle axis z.

FIG. 8 shows a cross-section through a guide device of the kind shown in FIGS. 7*a* to 7*e*. The guide post 501*a* is thereby connected at fixing points 510 to an assembly support 50' which can be fitted on the door inside skin, more particularly the door inside plate of a vehicle door. The support plate 502' of an armrest is in this case mounted for swivel movement by means of the guide sleeves 503 on the guide post 501a.

The swivel movement of the support plate 502' about the vertical vehicle axis z is however restricted, by two supporting areas protruding from the assembly support 50' towards the support plate 502' in the form of projections 51' which are arranged either side of the guide post 501a spaced from each other along the vehicle longitudinal axis x and whose free ends form support faces for the support plate 502' of the arm support. Transverse forces which lead to torque about the vertical vehicle axis can hereby be supported. Such transverse forces are introduced into the arm support and thus the support plate 502' for example when a grab handle is integrated in the arm support or even in the case of misuse.

Since the support plate 502' is secured against tilting too sharply through the projections 51' which are formed from the assembly support 50', preferably by imprinting or deep drawing, it is hereby ensured with a very cost-effective simply structured guide device having just one guide post 501a and no additional guide rails serving for anti-rotating lock, that larger transverse forces are diverted not into the door inner trim but through the projections 51' into the door body.

FIGS. 9a to 9c show elongated guide posts 501b, 501c, 501d formed as profiled parts of different cross-section and each formed in one piece on an assembly support 50", 50''', 50'''' of a vehicle door or alternatively a door inside panel and each associated with a corresponding profiled member 543a, 543b, 543c as a guide member which is connected to or moulded on the support plate of an arm support.

Basically any type of profiled parts can be used to form a longitudinal guide, such as e.g. H, C or L shaped profiles which enable a precise longitudinal guidance along the vertical vehicle axis and a reliable support perpendicular to this along the vehicle longitudinal axis.

In a reversal of the conditions shown in the previous figures the elongated guide element could also be provided in the form of a guide post or the like on the longitudinally displaceable support plate of the arm support and the associated guide members, for example in the form of guide sleeves, could be provided on the supporting door element, such as door inside skin or assembly support.

Furthermore instead of several, more particularly two, guide sleeves spaced out from each other along the vertical vehicle axis it is also possible to use a single guide sleeve which extends over the longest possible stretch along the vertical vehicle axis.

FIGS. 10a and 10b show in cross-section two different designs each of an elongated guide rail 542a, 542b provided on an assembly support 50'''' of a vehicle door and serving as an anti-rotation lock and associated with corresponding slide and supporting areas 547a, 547b formed in one piece or fixed on a support plate of an arm support.

From FIGS. 9a to 9c it can be seen that the guide posts 501b to 501d illustrated there and the associated guide members 543a to 543c each interact along the vehicle axis x substantially free of play or with slight play so that forces acting in the vehicle longitudinal direction x as well as torque acting about the vertical vehicle axis y can be absorbed and diverted into the assembly support 50", 50''', 50''''.

As opposed to this the guide rails 542a and 542b are each mounted relative to each other with the associated slide or guide areas 547a, 547b with some play along the vehicle longitudinal axis x and substantially play-free or with very slight play transversely thereto along the vertical axis y. Thus in particular forces acting along the vertical vehicle axis y as well as torque about the vertical axis z are absorbed.

It is decisive that the central guide post and the associated guide members have a substantially smaller amount of play along the vehicle longitudinal axis than the anti-rotation locks additionally provided which are formed by guide rails and associated slide or support areas, and that on the other hand the last-mentioned anti-rotation locks have a smaller play along the vehicle transverse axis y running perpendicular to the door plane than the guide posts with the associated guide members.

It is hereby ensured that forces acting in the vehicle longitudinal direction x can be diverted through the central guide post and forces acting along the vehicle transverse axis y can be diverted through the additional anti rotation locks into a supporting door element such as an assembly support without the system being over-specified.

What is claimed is:

1. An armrest subassembly for a motor vehicle door for installation in a motor vehicle, which has a vehicle longitudinal axis and a vertical vehicle axis, comprising:

an arm support vertically adjustable generally along the vertical vehicle axis; and a guide device through which the arm support is guided generally along the vertical vehicle axis, wherein the guide device has just one elongated guide element along an adjusting directions of the arm support to guide the arm support, the elongated guide element coupled with the arm support and a supporting door element so that forces acting in the vehicle longitudinal direction on the arm support are introduced through the elongated guide element into the supporting door element and displacement of the arm support in the vehicle longitudinal direction is substantially prevented, and wherein additional supporting areas support the arm support on the supporting door element, to restrict a swivel movement of the arm support generally relative to the vertical vehicle axis, such that the arm support and the supporting door element interact with play through the supporting areas so that forces acting along the vehicle longitudinal direction are only substantially introduced into the supporting door element through the elongated guide element.

2. The armrest subassembly according to claim 1, wherein the elongated guide element is coupled between the arm support and the supporting door element such that the arm support is substantially prevented from tilting about an axis running perpendicular to the door plane.

3. The armrest subassembly according to claim 1 or 2, wherein the arm support is fixed on a holder which is guided on the elongated guide element.

4. The armrest subassembly according to claim 3, wherein the holder comprises a support plate.

5. The armrest subassembly according to claim 1, wherein the elongated guide element comprises a post.

6. The armrest subassembly according to claim 1, wherein the guide element is substantially tubular.

7. The armrest subassembly according to claim 1, wherein the guide element is at least one of substantially hollow cylindrical and a profiled part.

8. The armrest subassembly according to claim 1, wherein the arm support is swivel mounted on the elongated guide element about the longitudinal axis of the elongated guide element.

9. The armrest subassembly according to claim 1, wherein the guide element is fixed on the supporting door element.

10. The armrest subassembly according to claim 1, wherein the elongated guided element is associated with at least one guide member which is mounted longitudinally displaceable on the elongated guide element.

11. The armrest subassembly according to claim 1, in that wherein the guide element is associated with at least two guide members which are spaced from each other along the adjusting direction of the guide element and which are displaceable relative to the guide element.

12. The armrest subassembly according to claim 11, wherein the at least two guide members have a largest possible spacing between them along the adjustment direction of the guide element.

13. The armrest subassembly according to claim 10, wherein just one guide member is provided which has the greatest length possible along the adjustment direction of the guide element.

14. The armrest subassembly according to one of claims 10 to 13, wherein the at least one or at least two guide member(s) is a guide sleeve.

15. The armrest subassembly according to one of claims 10 to 13, wherein the at least one or at least two guide member(s) comprises a tapering of a guide channel.

16. The armrest subassembly according to one of claims 10 to 13, wherein the at least one or at least two guide member(s) comprises a profiled member.

17. The armrest subassembly according to claim 10, wherein the at least one guide member is fixed relative to the arm support.

18. The armrest subassembly according to claim 3, wherein the guide member is fixed on the holder.

19. The armrest subassembly according to claim 11, wherein the at least two guide members are each mounted at one edge of a holder as viewed along the vertical vehicle axis.

20. The armrest subassembly according to claim 13, wherein the just one guide member extends over an entire length of a holder viewed along the vertical vehicle axis.

21. The armrest subassembly according to claim 1, wherein the supporting areas comprise two projections which extend between the arm support and a supporting door element and wherein the two projections are spaced from each other along the vehicle longitudinal axis on either side of the elongated guide element.

22. The armrest subassembly according to claim 21, wherein the two projections extend between a holder of the arm support and the supporting door element.

23. The armrest subassembly according to claim 21, wherein the projections are formed on the supporting door element.

24. The armrest subassembly according to claim 1, wherein two longitudinal guides spaced from each other in the vehicle longitudinal direction and arranged on either side of the elongated guide element are provided as an additional anti-rotation lock.

25. The armrest subassembly according to claim 24, wherein the longitudinal guides comprise a guide rail and a guide displaceable in the longitudinal direction relative thereto.

26. The armrest subassembly according to claim 25, wherein the guide rail is provided on the supporting door element.

27. The armrest subassembly according to claim 1, wherein the guide device has elastic elements serving to prevent rattling.

\* \* \* \* \*

UNITED STATES PATENT AND TRADEMARK OFFICE
CERTIFICATE OF CORRECTION

PATENT NO. : 6,796,601 B2
DATED : September 28, 2004
INVENTOR(S) : Börnchen et al.

It is certified that error appears in the above-identified patent and that said Letters Patent is hereby corrected as shown below:

<u>Column 10,</u>
Line 31, delete "directions",
      insert -- direction --.

<u>Column 11,</u>
Line 4, delete "guided",
      insert -- guide --.
Line 7, delete "in that".

Signed and Sealed this

Sixteenth Day of August, 2005

JON W. DUDAS
*Director of the United States Patent and Trademark Office*